United States Patent [19]

Nozuyama

[11] Patent Number: 5,867,409
[45] Date of Patent: Feb. 2, 1999

[54] LINEAR FEEDBACK SHIFT REGISTER

[75] Inventor: Yasuyuki Nozuyama, Tokyo, Japan

[73] Assignee: Kabushiki Kaisha Toshiba, Kawasaki, Japan

[21] Appl. No.: 896,635

[22] Filed: Jul. 18, 1997

Related U.S. Application Data

[63] Continuation of Ser. No. 401,434, Mar. 9, 1995, abandoned.

[51] Int. Cl.[6] .............................. G06F 1/02; G01R 31/28
[52] U.S. Cl. .................................. 364/717.03; 371/22.4; 377/72
[58] Field of Search .................................. 327/156, 144; 326/16; 364/717.01, 717.07; 371/22.3, 22.2, 27, 3, 22.4, 21.3, 22.1; 324/158; 377/72

[56] References Cited

U.S. PATENT DOCUMENTS

| | | | |
|---|---|---|---|
| 4,908,795 | 3/1990 | Tsuchiya et al. | 365/189.01 |
| 5,043,990 | 8/1991 | Doi et al. | 371/68.1 |
| 5,090,035 | 2/1992 | Murase | 377/72 |
| 5,150,325 | 9/1992 | Yanagisawa et al. | 365/177 |
| 5,175,447 | 12/1992 | Kawasaki et al. | 307/480 |
| 5,175,494 | 12/1992 | Yoshimori | 324/158 |
| 5,184,067 | 2/1993 | Nozuyama | 324/158 |
| 5,189,675 | 2/1993 | Nozuyama et al. | 371/22.3 |
| 5,321,641 | 6/1994 | Ohkubo | 364/717 |
| 5,329,254 | 7/1994 | Takano | 331/34 |
| 5,351,211 | 9/1994 | Higeta et al. | 365/189.05 |
| 5,369,648 | 11/1994 | Nelson | 371/27 |
| 5,488,615 | 1/1996 | Kunoff et al. | 371/22.4 |
| 5,504,755 | 4/1996 | Nozuyama | 371/22.2 |
| 5,588,006 | 12/1996 | Nozuyama | 371/3 |

*Primary Examiner*—Emmanuel L. Moise
*Attorney, Agent, or Firm*—Finnegan, Henderson, Farabow, Garrett & Dunner, L.L.P.

[57] ABSTRACT

A linear feedback shift register includes a plurality of groups of flip-flops operated in synchronization with different clock signals and a condition satisfying circuit, provided in a wiring for connecting the pairs of flip-flops to each other, for satisfying conditions for one of linear feedback and generation of pseudorandom numbers.

19 Claims, 8 Drawing Sheets

LINEAR FEEDBACK SHIFT REGISTER

This application is a continuation, of application Ser. No. 08/401,434, filed Mar. 9 1995, now abandoned.

BACKGROUND OF THE INVENTION

1. Field of the Invention

The present invention relates to a linear feedback shift register and, more specifically, to a linear feedback shift register useful for a design for testability of an LSI (large scale integrated circuit), a VLSI (very large scale integrated circuit), and a ULSI (ultra large scale integrated circuit), in particular for a built-in self test of these circuits.

2. Description of the Related Art

In accordance with great progress in semiconductor technology, a VLSI chip which is larger, more complicated, with higher performance than an LSI chip, has appeared, and a ULSI chip will make its appearance in the near future. The problem of how these chips are to be tested has become very serious. A conventional LSI chip is generally tested by an LSI tester using its function only for a normal operation. The VLSI and ULSI chips need a great number of test vectors and, accordingly, the efficiency of an LSI tester required to test these chips becomes higher and higher. Since, further, an objective judgement of to what degree the chips are tested by the test vector has to be made separately, a CPU cost is greatly increased.

As is evident from the above, it is actually almost impossible to completely test the VLSI and ULSI chips by the conventional method. To solve the above problem, a design for testability capable of perfectly testing a chip at low cost by incorporating a test circuit in advance into the chip, has lately attracted attention and become popular.

In a built-in self test (referred to as BIST hereinafter) which is one type of the designs for testability, an LSI chip to be tested as a device under test (referred to as DUT hereinafter) incorporates a test data generation circuit and a test result generation circuit to start the test in response to an externally supplied signal and, after the test, output a pass/fail result signal or a test result data. This test hardly requires an LSI tester and is considerably effective in reduction in test cost. Moreover, the chip can be tested under the same condition as in the case of the actual use thereof, as can be the chip incorporated into a system. In view of these advantages, the BIST is expected that it will be remarkably important to the VLSI and ULSI chips.

The most basic technique of the BIST described above is signature analysis using a linear feedback shift register (hereinafter referred to as LFSR).

First the LFSR will be described.

Figure 1:
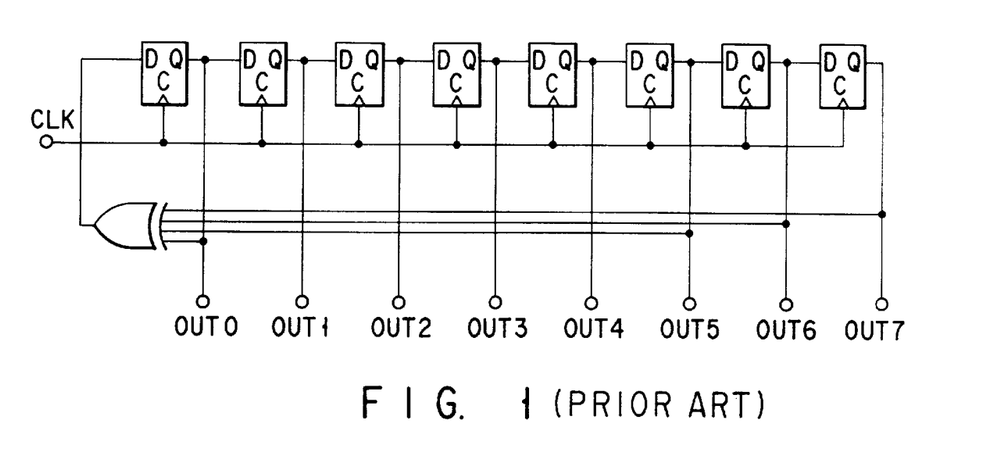
FIG. 1 is a view showing a circuit arrangement of a conventional linear feedback shift register serving as a test data generation circuit.

The LFSR (n bit width) can be used as both a test data generation circuit and a test result generation circuit. The LFSR (n=8) serving as the test data generation circuit is, as shown in FIG. 1, a simple register circuit including serial-connected n D-type flip-flops (referred to as F/F hereinafter) and a feedback circuit for generating an exclusive-OR (referred to as XOR hereinafter) signal of outputs Q of predetermined F/F and supplying it to an input terminal D of the first one of the serial-connected F/F.

The initial value other than all-0 is set to the F/F to operate the LFSR (whose initializing circuit is omitted in the figure). $2^n-1$ of random data (pseudorandom numbers), which are the maximum numbers obtained from the LFSR, are repeatedly output in predetermined order. The random data can be sequentially taken out by using any one of outputs $Out_i$ (i=0, 1, . . . , 7) of the F/F, or they can be taken out in parallel by using all these outputs.

The latter technique using all the outputs of the F/F is generally-used in and important to the recent VLSI and ULSI of multi-bits for processing data.

The signature analysis is a technique of using the LFSR as a test result generation circuit and, in this case, the LFSR comprises an LFSR for inputting the outputs of the DUT in serial and an LFSR called an MISR (multiple input signature register), for inputting them in parallel. In the VLSI and ULSI, the latter LFSR is overwhelmingly important. The following descriptions are therefore made in connection with the LFSR called MISR.

Figure 2:
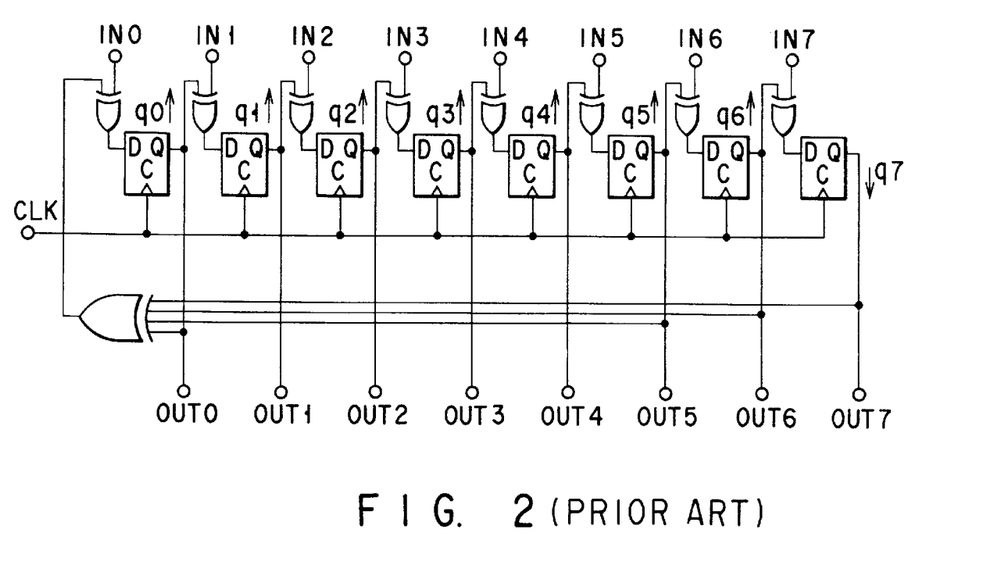
FIG. 2 is a view showing a circuit arrangement of a conventional linear feedback shift register serving as a test result generation circuit.

An example of an n-bit parallel input type LFSR (n=8) is shown in FIG. 2. As shown in FIG. 2, the input terminal D of bit 0 of the LFSR is supplied with an XOR signal of an output signal FB of the feedback circuit and an external data signal IN0 of the bit 0. The input terminals D of the F/F of bits 1 to 7 are supplied with an XOR signal of a signal output from the output Q of the F/F of the preceding bit and an external data signal IN of the very bit. The output signal FB is an XOR signal of a signal $Q_0$ output from output terminal Q of the F/F of bit 0, a signal $Q_5$ output from output terminal Q of the F/F of bit 5, a signal $Q_6$ output from output terminal Q of the F/F of bit 6, and a signal $Q_7$ output from output terminal Q of the F/F of bit 7. New data $Q'_i$ (i=0, 1, . . . , 7) are generated inside the LFSR and expressed by the following equations:

$$Q'_0 = IN0 \text{ XOR } FB \tag{1}$$

$$Q'_{i+1} = INn \text{ XOR } Q_i (i=0, 1, \ldots 6) \tag{2}$$

where XOR represents an XOR operation.

With the above circuit arrangement of the LFSR, since the signals output from the DUT are supplied in sequence to the LFSR storing a predetermined value, almost random data is generated in the F/F in response to the output signals and finally data of a certain test result is generated therein. The data generated in the LFSR is called a signature, while an operation of generating the signature by supplying the output signals of the DUT to the LFSR is called signature compression or signature analysis. In the signature analysis, the output signals of the DUT are signature-compressed using a series of data, and a test result (signature) finally left in the LFSR is compared with an expected value only once to judge whether the DUT is defect-free or not.

After the signature compression is executed using test data, the probability that the signature is correct, $1-2^{-n}$, which is obtained by subtracting the "aliasing" probability from 1. The "aliasing" is a phenomenon wherein the final signature (test result) becomes equal to that obtained by the correct output sequence of the DUT though some incorrect output are output during the test. Since, in general, the aliasing probability can be ignored when n is increased (n>24), the reliability of signature analysis is extremely high in the VLSI and ULSI which process data of multiple bits ($n \geq 32$).

The above-described is sometimes provided exclusively for the BIST, however, it can be often constructed from a normal operation type register in order to economize the test circuit.

Since the conventional LFSR described above was regarded as one circuit block, only the circuit operated in response to a single clock signal supplied from outside has been considered to be the LFSR. The BIST using the LFSR was first applied to circuits having a regular structure such as ROM, RAM and PLA. These circuits each correspond to a circuit block closed by a register or F/F, and their outputs are usually stored in an output register. In the BIST wherein an LFSR formed from the output register is used as a signature compression circuit, a delay in AC output of the DUT can be checked at the same time.

Not in the above circuit block having a regular structure but in a so-called random logic, if a DUT having a structure closed by a register or F/F whose system clocks are changed at the edges thereof can be achieved (an unimportant signal can be set to a fixed value during the BIST), the BIST can be effectively implemented. Such a BIST has been employed depending on the situation.

In the I/O (input/output) section of a commonly-used LSI, an output signal of the LSI is delayed by a predetermined period of time based on the edges of system clocks. For this reason, the conventional BIST using an LFSR operated at the edge of system clock is applied to the output terminal of the LSI, a logical value can be checked by the LFSR at the timing when data is sampled (at the edge of the system clock), but a delay in AC output of the DUT cannot be detected.

Basically, the application of the conventional BIST to the I/O terminal of the LSI cannot be achieved, including an important process of checking a delay in AC output.

There is very strong possibility that a method of improving the performance of VLSI or ULSI by mixing circuit blocks operated in synchronization with a plurality of clocks (including the same clocks having different edges) therein will become important. In the BIST using the conventional LFSR, since the LFSR requires a sufficient bit length in order to decrease the Aliasing probability to such a negligible extent, an extra F/F has to be added to each group of registers and F/F, with the result that the LFSR is increased in area.

To avoid such an overhead cost, the application of the BIST was likely to be given up.

SUMMARY OF THE INVENTION

The present invention has been developed in consideration of the above situation and its object is to provide a linear feedback shift register including flip-flops operated in synchronization with different clock signals and satisfying the conditions for linear feedback or generation of pseudorandom numbers.

To attain the above object, there is provided a linear feedback shift register comprising a plurality of pairs of flip-flops operated in synchronization with different clock signals, and a condition satisfying circuit, interposed between the pairs of flip-flops, for satisfying the conditions for linear feedback or generation of pseudorandom numbers.

In the linear feedback shift register having the above arrangement, the plurality of flip-flops can be operated cooperatively as a single LFSR since the condition satisfying circuit is interposed between the pairs of flip-flops. The register can thus be operated in synchronization with the clock signals different for the respective flip-flops.

The foregoing linear feedback shift register can effectively be applied to the BIST for LSI. For example, in a recent LSI, groups of flip-flops are arranged in a boundary scanning circuit and operated in synchronization with a plurality of clock signals. Since these flip-flops are so operated, signature compression can be achieved at different clock edges as well as system clock edges of the LSI. Consequently, a delay in AC output of a DUT can be detected when the register is applied to an I/O terminal section of the LSI. Such a delay cannot be detected in a linear feedback shift register whose flip-flops are synchronized only with system clocks.

If a boundary scanning circuit is formed in the linear feedback shift register having the above constitution, the register, which has such a bit length that the Alias probability can be ignored, requires no additional flip-flops, thus improving in area efficiency.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 5A and 5B are views for explaining a latch circuit included in a linear feedback shift register according to a second embodiment of the present invention, in which FIG. 5A is a view of a circuit arrangement of the linear feedback shift register and FIG. 5B is a circuit diagram of a clocked inverter of the register shown in FIG. 5A;

DETAILED DESCRIPTION OF THE PREFERRED EMBODIMENTS

Embodiments of the present invention will now be described, with reference to the accompanying drawings.

Figure 3:
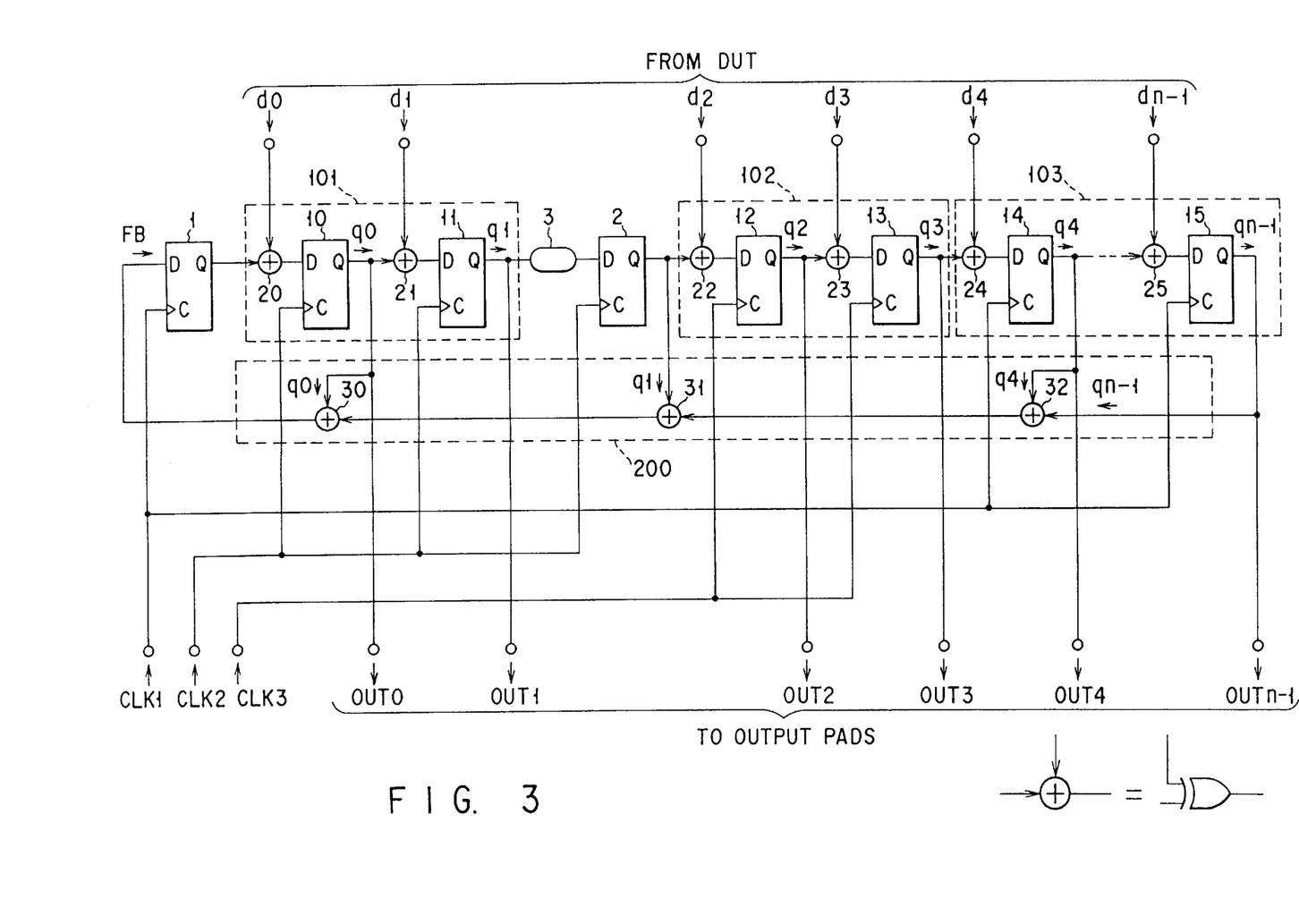
FIG. 3 is a view showing a circuit arrangement of a linear feedback shift register according to a first embodiment of the present invention.

FIG. 3 is a view showing an LFSR according to a first embodiment of the present invention.

The LFSR shown in FIG. 3 is an n-bit parallel-input type LFSR operated in response to three clock signals CLK1, CLK2 and CLK3. The LFSR includes a first circuit 101 having flip-flops (F/F) 10 and 11 and operated in synchronization with the clock signal CLK2, a second circuit 102 having F/F 12 and 13 and operated in synchronization with the clock signal CLK3, and a third circuit 103 having F/F 14, . . . , 15 and operated in synchronization with the clock signal CLK1. These circuits 101 to 103 are connected in series to each other. Series-connected delay 3 and F/F 2 are inserted between the first and second circuits 101 and 102. The third circuit 103 is connected to the first circuit 101 through a feedback circuit 200, and an F/F 1 is interposed between the feedback circuit 200 and first circuit 101. Terminal D of the F/F 1 is supplied with a feedback signal FB, and terminal Q thereof is connected to a first input of an XOR (exclusive OR) gate 20. A second input of the gate 20 is connected to a data signal terminal $d_0$. An output of the gate 20 is connected to a terminal D of the F/F 10. A terminal Q of the F/F 10 is connected to a first input of an XOR gate 21 and to that of an XOR gate 30 in the feedback circuit 200. A second input of the gate 21 is connected to a data signal terminal $d_1$. An output of the gate 21 is connected to a terminal D of the F/F 11, and a terminal Q of the F/F 11 is connected to one end of the delay 3. The other end of the delay 3 is connected to a terminal D of the F/F 2. A terminal Q of the F/F 2 is connected to a first input of an XOR gate 22 and to that of an XOR gate 32 in the feedback circuit 200. A second input of the gate 22 is connected to a data signal terminal $d_2$. An output of the gate 22 is connected to a terminal D of the F/F 12, and a terminal Q of the F/F 12 is connected to a first input of an XOR gate 23. A second input of the gate 23 is connected to a data signal terminal $d_3$, and an output thereof is connected to a terminal D of the F/F 13. A terminal Q of the F/F 13 is connected to a first input of an XOR gate 24. A second input of the gate 24 is connected to a data signal terminal $d_4$, and an output thereof is connected to a terminal D of the F/F 14. A terminal Q of the F/F 14 is connected to a first input of an XOR gate 32 in the feedback circuit 200 and to that of an XOR gate (not shown) in the same fashion as in the first and second circuits 101 and 102. An output of the XOR gate (not shown) is connected to a terminal D of an F/F (not shown), and a terminal Q of a F/F (not shown) is connected to a first input of an XOR gate 25 (which implies that two or more flip-flops can be formed in each circuit in accordance with the number of data signal terminals d, and it is also possible that the circuit includes only one flip-flop). A second input of the XOR gate 25 is connected to a data signal terminal $d_{n-1}$ and an output thereof is connected to a terminal D of the F/F 15. A terminal Q of the F/F 15 is connected to a second input of the XOR gate 32, and an output of the gate 32 is connected to a second input of an XOR gate 31. An output of the XOR gate 31 is connected to a second input of the XOR gate 30. An output of the gate 30 is connected to the terminal D of the F/F 1. The XOR gate 30 outputs the feedback signal FB. In the first embodiment, an appropriate F/F for generating the feedback signal FB is selected in order to explain an operation of the LFSR.

Figure 4:
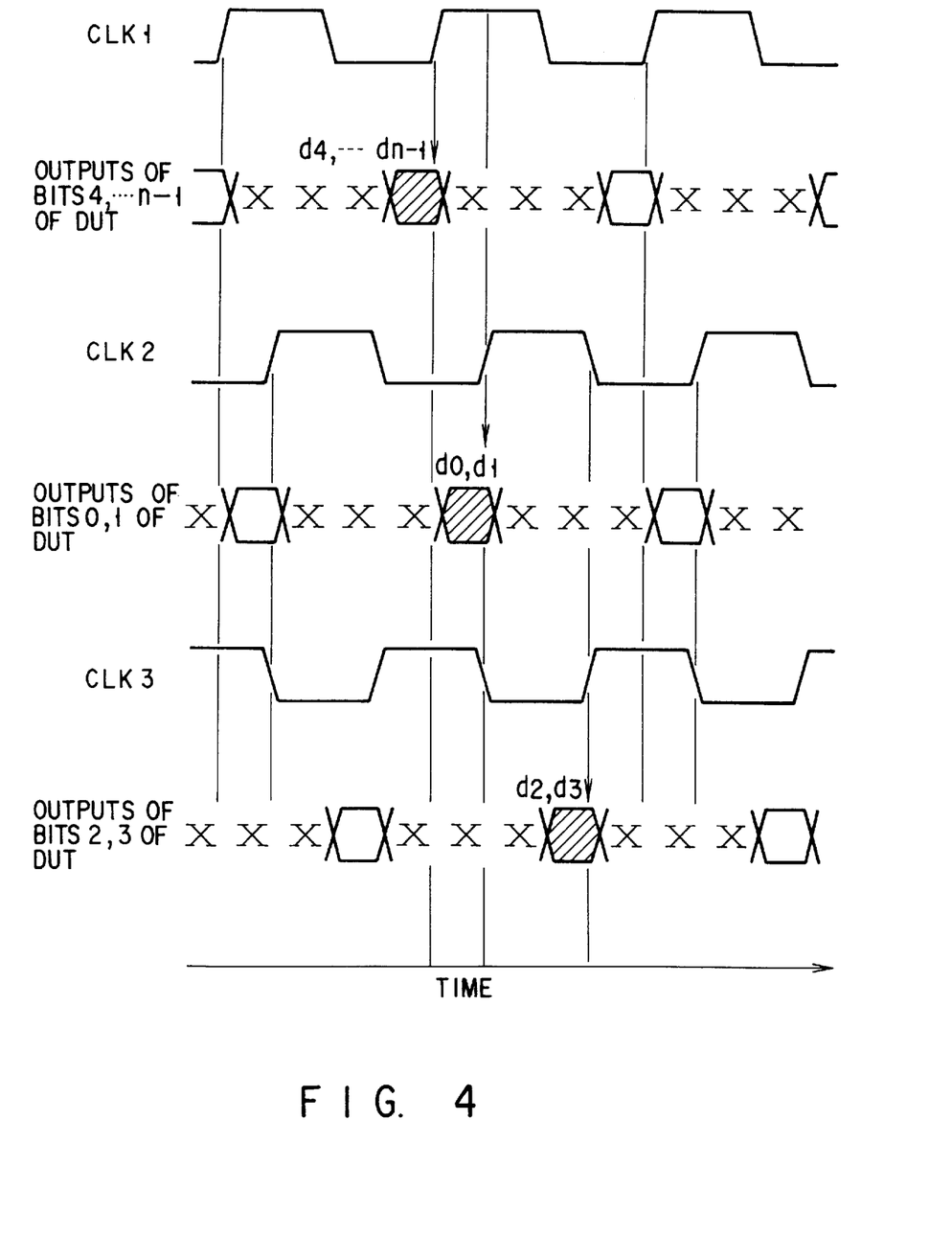
FIG. 4 is a timing chart of the linear feedback shift register shown in FIG. 3.

The flip-flops (F/F) 1, 2 and 10 to 15 of the LFSR latch data input to their terminals D at the up edges of three clock signals CLK1, CLK2 and CLK3 (hereinafter referred to as CLK1↑, CLK2↑ and CLK3↑). The F/F 1 and 14-15 latch the data at CLK1↑, the F/F 2, 10 and 11 does at CLK2↑, and the F/F 12 and 13 does at CLK3↑. (In this embodiment, the F/F latch the data at the up edges of the clock signals, but they can be replaced with an F/F having a different circuit arrangement.) The relationship in timing between these clock signals CLK1 to CLK3 is shown in FIG. 4.

When an LFSR is operated in response to a plurality of clock signals, it is indefinite what data of a DUT (device under test) and what data of the LFSR are signature-compressed together. To implement the operation condition of signature compression, the LFSR should be constituted by clarifying a pair of data to be signature-compressed. If the conditions are satisfied, a high-precision BIST can be carried out as expected.

Generally, in whatever logic circuit of a sync type, output data is generated in accordance with predetermined input data corresponding to each cycle of a system clock. By utilizing this fact, a pair of data items to be signature-compressed can be clarified. The LFSR shown in FIG. 3 are supplied from the DUT (not shown) with data $d_0, d_1, \ldots, d_{n-1}$ to be signature-compressed, these data are compressed to their corresponding flip-flops (F/F) in the order of (A) to (C) described below. In this specification, the "compression" means that data items are EXCLUSIVE ORed and latched to the F/F.

(A) Data items $d_4, \ldots, d_{n-1}$ are compressed to F/F 14 to 15 in response to CLK1↑.

(B) Data items $d_0$ and $d_1$ are compressed to F/F 10 and 11 in response to CLK2↑.

(C) Data items $d_2$ and $d_3$ are compressed to F/F 12 and 13 in response to CLK3↑.

The timing chart of the above operations of the LFSR is shown in FIG. 4. The data items $d_0, \ldots, d_{n-1}$ correspond to the hatched areas in FIG. 4, and compressed to their corresponding F/F at the time indicated by the downward arrows in the same Figure. In FIG. 4, "X" represents that no effective data is output.

As has been described in the Background of the Invention, if signature compression is executed between the data $d_0, \ldots, d_{n-1}$ and those $q_0, \ldots, q_{n-1}$ of F/F in the LFSR, and then the latter data are changed to $q'_0, \ldots, q'_{n-1}$ the following equations have to be satisfied:

$$q'_0 = d_0 \text{XOR } FB(FB = q_0, XOR_{q1}, XOR_{q4}, XOR_{qn-1}) \quad (3)$$

$$q'_i = d_i, XOR_{qi-1}(i=1, \ldots, n-1) \quad (4)$$

The above operations (A) to (C) will be described in detail, in view of the above equations.

In the operation (A), data $q'_4, \ldots, q'_{n-1}$ are generated from $d_4, d_{n-1}$ and $q_4, \ldots, q_{n-1}, \ldots, q'_{n-1}$ so as to satisfy the equation (4), and stored in their corresponding F/F 14, . . . , 15. It should be noted that the feedback signal FB is changed to $$FB' = q_0 \text{ XOR}_{q1} \text{ XOR}_{q'4} \text{ XOR}_{q'n-1}$$

There are no problems in the operation (B) since the equation (4) is satisfied among data $d_1, q_0$, and $q'_1$, though it should be noted that data $q_1$ relative to the latch of data at CLK3↑ is changed to $q'_1$. As for the equation (3), since the feedback signal FB has been changed to FB', data $q'_0$ becomes equal to $d_0$XOR FB' in the LFSR having a conventional structure, and the conditions for signature compression are lost. In the first embodiment, therefore, the flip-flop (F/F) 1 for latching the feedback signal FB at CLK1↑ and holding it, is inserted, as shown in FIG. 3, to satisfy the equation (3).

In the operation (C), no problems occur since the equation (4) is satisfied among data items $d_3, q_2$, and $q'_3$. As in the operation (B), data $q'_2$ becomes equal to $d_1$XOR$_{q'1}$, and the conditions for signature compression are lost in the conventional LFSR. Therefore, in the first embodiment, the F/F 2 for latching data at CLK2↑ and holding it, is inserted, as in the case of the operation (B), to satisfy the equation (3). Though the delay 3 is provided to correctly supply data from F/F 11 to F/F 2, it is sometimes unnecessary.

As described above, in the first embodiment, a plurality of serial circuits including F/F can be cooperatively operated as a single LFSR, in synchronization with different clock signals, by inserting F/F 1 and 2 for temporarily holding data in proper positions to satisfy the linear feedback conditions for signature compression.

An LFSR according to a second embodiment of the present invention will now be described, with reference to FIGS. 3 to 5A and 5B.

Figure 5A:
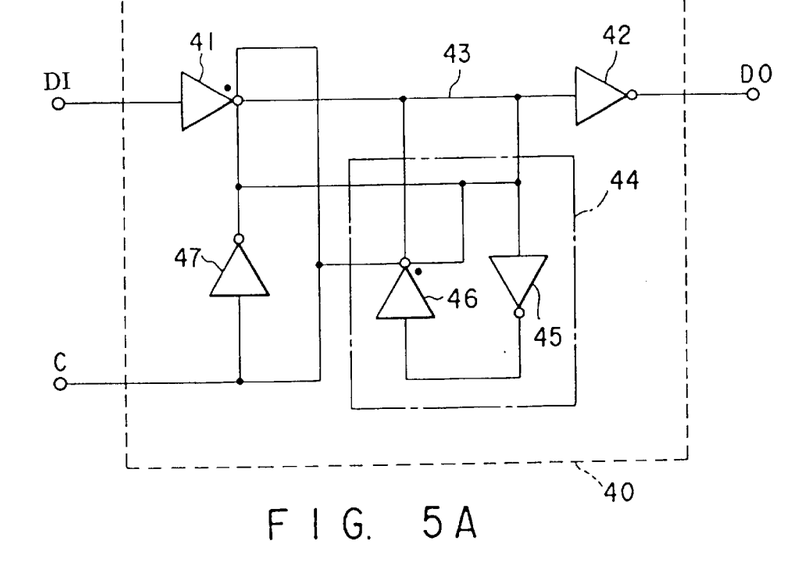

The LFSR of the second embodiment comprises a simple circuit capable of performing the functions of F/F 1 and 2 of the LFSR of the first embodiment. FIG. 5A shows an arrangement of the simple circuit.

Figure 5B:
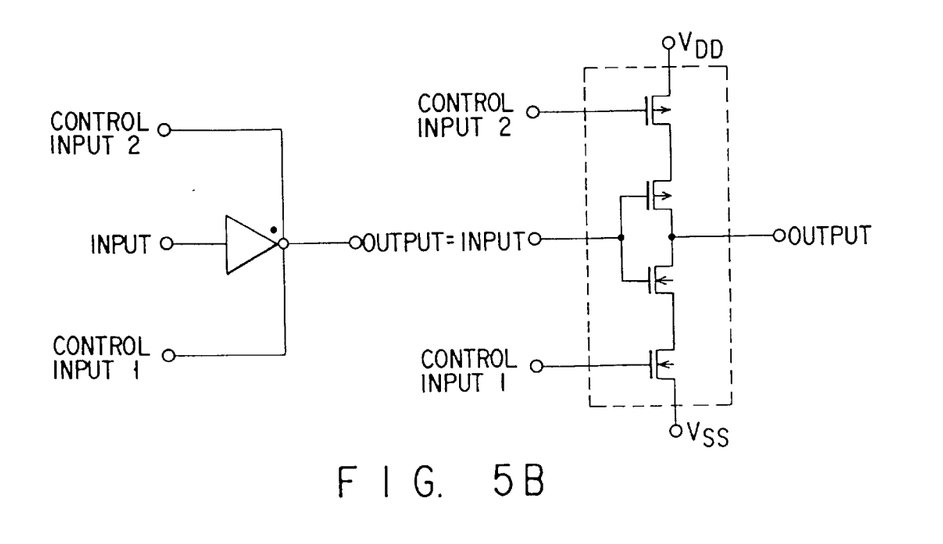

The circuit shown in FIG. 5A is a latch circuit 40. The latch circuit 40 includes an clocked inverter 41 serving as an input section connected to a terminal D, an inverter 42 serving as an output section supplied with a signal output from the clocked inverter 41 and connected to a terminal DO, and a latch section 44 connected to a node 43 of these inverters 41 and 42. The latch section 44 includes an inverter 45 an input thereof is connected to the node 43 and a clocked inverter 46 supplied with a signal output from the inverter 45. The output of the clocked inverter 46 is connected to the node 43. FIG. 5B shows a fundamental circuit arrangement of the clocked inverters 41 and 46. Each of the clocked inverters has three inputs of a control input 1, a control input 2, and an input, and one output. In the normal operation, an inversion of the control input 1 is used as the control input 2. When the control input 1 is low (referred to as 0 hereinafter), the output exhibits a high impedance (hi-Z), irrespective of the value of the input. When the control input 1 is high (referred to as 1), the same logical operation as that of the inverter is performed. A clock signal is input to a terminal C of the latch circuit and supplied to the control input 2 of the clocked inverter 41 and the control input 1 of the clocked inverter 46. The latch circuit 40 also includes an inverter 47 for generating an inverted signal of the clock signal input to the terminal C, and an output signal of the inverter 47 is supplied to the control input 1 of the inverter 41 and the control input 2 of the inverter 46. In FIG. 5A, the black spots added in the vicinity of the inverters 41 and 46 indicate that their adjacent inputs are control inputs 2.

An operation of the LFSR, shown in FIG. 3, incorporating the latch circuit 40, will be described.

First, as is apparent from FIG. 4, it is during a period of CLK1=1 that data $d_0$ and $d_1$ are compressed at CLK2↑. In other words, the feedback signal FB has only to be held during the period.

The latch circuit 40 shown in FIG. 5A latches data input to a terminal DI at the up edge of the clock signal input to the terminal C, and holds it during a period of the clock signal=1. The circuit 40 supplies a clock signal, input to the terminal D, to the terminal DO during a period of the clock signal=0. If, therefore, the latch circuit 40 is provided in place of the F/F 1 shown in FIG. 3, and the CLK1 is supplied to the terminal C of the circuit 40, the objective can be sufficiently attained, though the number of latch circuits is reduced to almost half of that of the F/F 1.

As is apparent from FIG. 4, the up edges CLK3↑ at which data items $d_2$ and $d_3$ are compressed, overlap a down edge CLK2↑ of CLK2. If the F/F 2 is replaced with the latch circuit 40 shown in FIG. 5A, the CLK2 is supplied to the terminal C. If there is a skew time between CLK2 and CLK3, and CLK3↑ is made later than CLK2↑ by a propagation delay from the terminal DI of the latch circuit 40 to the output of the XOR gate 22 shown in FIG. 3 via the terminal DO, the changed data $q'_1$ is likely to be EXCLUSIVE-ORed with data $d_1$ from the DUT and latched to the F/F 12. If, however, timing is set between CLK2↓ and CLK3↑ in view of this, the above propagation delay is considerably longer than an attainable skew time between the clock signals, the latch circuit 40 can be employed. However, the setting of the timing is troublesome and somewhat risky. It is thus desirable to use the F/F 2 since it is easy to design and reliable to operate.

As is understood from the above, the essence of the present invention is that a plurality of flip-flop (F/F) circuit each having one flip-flop or flip-flops operated in synchronization with different clocks are connected to each other to constitute a single LFSR and, when a clock signal (including a feedback signal) for operating an F/F for transmitting data anticipates a clock signal for operating an F/F for receiving data, an F/F or a latch circuit for temporarily holding data stored in the former F/F is inserted so as not to lose the conditions for signature compression. According to the above descriptions, the cycles of the clock signals are the same and only the phases thereof are different. However, the present invention can be applied to the case of clock signals having different cycles.

In the above embodiment, the number of F/F or latch circuits can be minimized to one if their relative positions can freely be varied between DUT. For example, when the circuits 101, 102, . . . whose data is changed by the edges of clocks CLK1, CLK2, . . . , formed in time series so as to satisfy the conditions for signature compression, are arranged in a direction opposite to the flow of data (excluding feedback data) in the LFSR, an F/F or latch circuit has only to be inserted to hold a feedback signal. By doing so, the number of additional circuits can be effectively reduced in the actual implement.

An LFSR according to a third embodiment of the present invention, which is used as a pseudorandom number generation circuit, will now be described.

Figure 6:
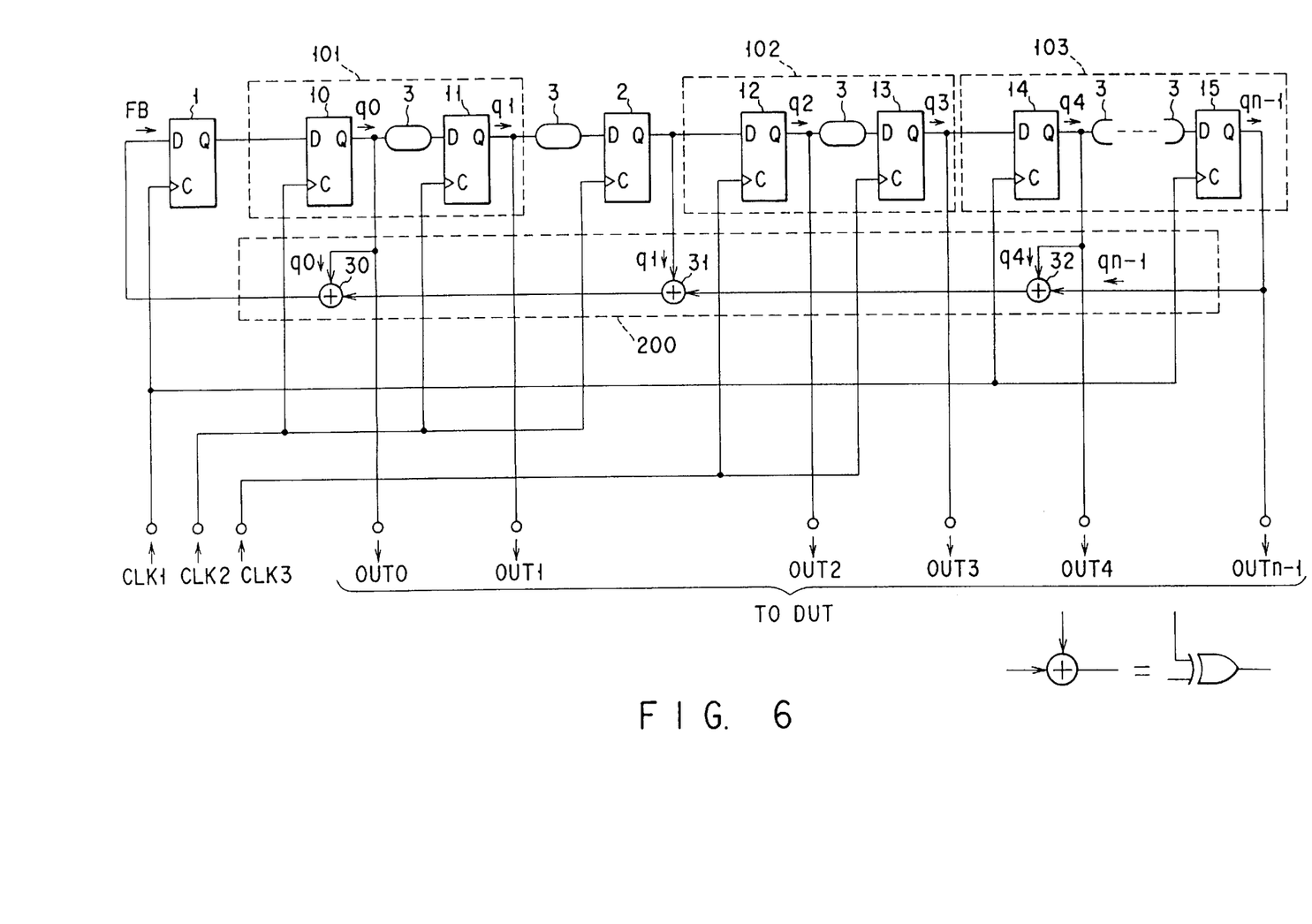
FIG. 6 is a view showing a circuit arrangement of a linear feedback shift register according to a third embodiment of the present invention.

To form a pseudorandom number generation circuit as illustrated in FIG. 6, the XOR circuits 20 to 25 for signature-compressing data output from the DUT are deleted from the circuit shown in FIG. 3, and the delay 3 has only to be added to a proper position for securing an exact operation (There is a case where the delay 3 is unnecessary).

In FIG. 6, the same elements as those of FIG. 3 are denoted by the same reference numerals. Clock signals CLK1, CLK2, and CLK3 are changed at the same timing as that of the clock signals shown in FIG. 4.

The conditions for generation of pseudorandom numbers of the maximum numbers ($2^{n-1}$ cycle) referred to as in the Background of the Invention, are as follows: (The LFSR is so constructed that the feedback signal FB has the maximum numbers.)

$$q'_0 = FB = q_0 \, XOR_{q1} \, XOR_{q4} \, XOR_{qn-1}$$

$$q'_i = q_{i-1} (i=1, \ldots, n-1)$$

In the pseudorandom number generation, unlike in the signature compression, it is difficult to define which clock signal is output first. However, the following relation is generally obtained from the constitution of the conventional LFSR, irrespective of the definition, and it is easily understood that the above conditions are not implemented.

$$q'_i = q'_{i-1} = q_{i-2}$$

It is therefore the most desirable to provide the F/F 1 and 2 (or latch circuits) as shown in FIG. 6.

An LSI in which an LFSR of the present invention is applied to an I/O section, will now be described as a fourth embodiment.

Since a register or an F/F is seldom provided at an I/O terminal of an I/O section, if the LFSR of the present invention is applied to the I/O section, an F/F has to be added to each I/O terminal. This is out of touch with reality because of an increase in area.

Recently it has been considerably difficult to carry out a test for a board on which a plurality of LSIs are mounted as the LSIs are increased in size and complicated. To solve such a problem, a boundary scan method was proposed and registered as an IEEE standard 1149.1. In this method, an F/F capable of scanning is provided at an I/O terminal of an I/O section of each of LSIs mounted on a board, and output data of the LSI can be observed outside the board and arbitrary data from outside the board can be supplied to the LSIs thereby facilitating a test for the board. "Boundary scan" comes from the fact that the F/F capable of scanning (i.e., boundary scan F/F) are arranged on the boundary of each LSI. In either case, there is high possibility that an F/F or register will be disposed at an I/O section of an LSI in view of testability of boards. Under the circumstances, the following embodiment is remarkably effective.

Figure 7:
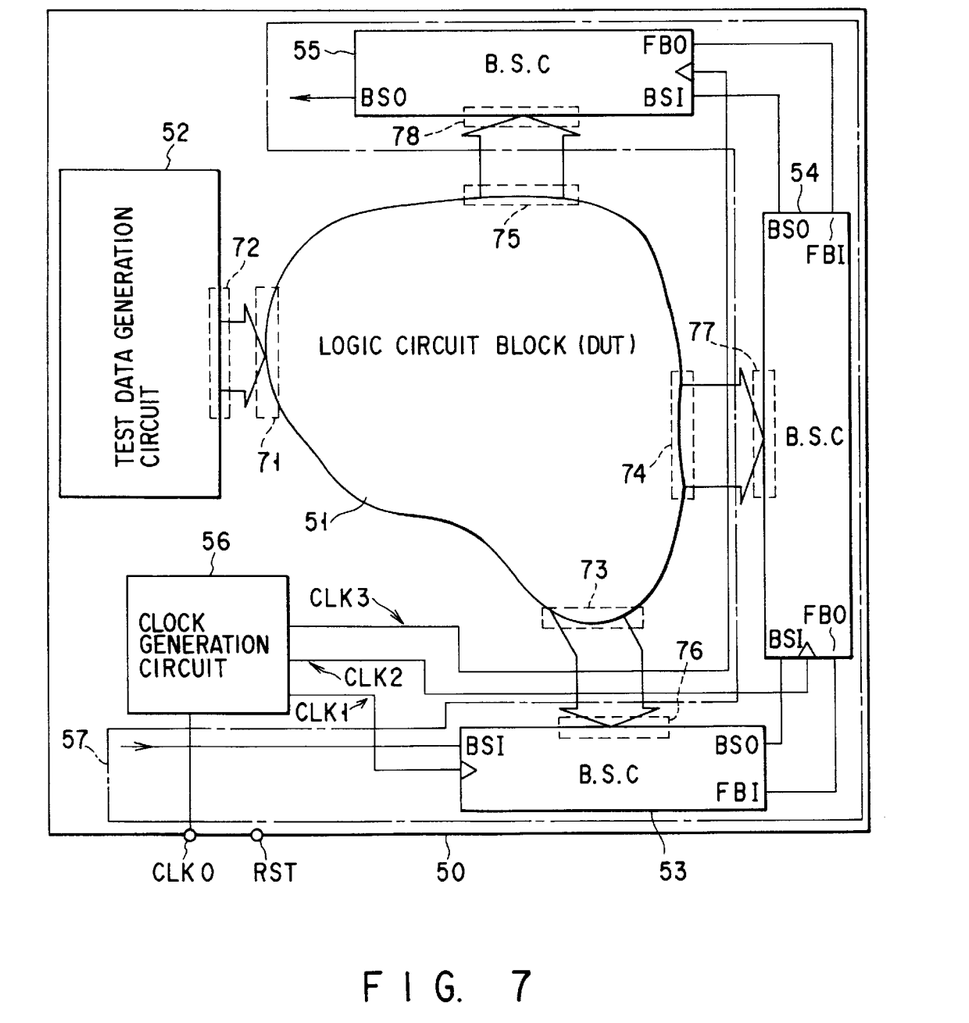
FIG. 7 is a view showing a constitution of a semiconductor integrated circuit device according to a fourth embodiment of the present invention.

As illustrated in FIG. 7, an LSI 50 includes a logic circuit block (DUT) 51 which is to undergo the BIST, a test data generation circuit block 52, three boundary scan circuit (referred to as B.S.C.) blocks 53, 54 and 55, and a clock generation circuit 56. The test data generation circuit block 52 is an LFSR which is based on the circuit arrangements shown in FIGS. 1 and 6. The B.S.C. blocks 53 to 55 are connected to each other and constitute one LFSR, based on the circuit arrangement shown in FIG. 3, to serve as a test result generation circuit 57. The logic circuit block 51 has an input terminal section 71 connected to an output terminal section 72 of the test data generation circuit block 52. The logic circuit block also has output terminal sections 73, 74 and 75. These sections 73, 74 and 75 are connected to an input terminal section 76 of the B.S.C. block 53, an input terminal section 77 of the B.S.C. block 54, and an input terminal section 78 of the B.S.C. block 55, respectively.

When the BIST is carried out, the logic circuit block 51 receives an output signal of the block 52 as test input data and then supplies a signal corresponding to the input data to each of the B.S.C. blocks 53 to 55.

The B.S.C. blocks 53 to 55 include boundary scan circuits. When the BIST is performed, the boundary scan circuits are operated in synchronization with their respective clock signals CLK1 to CLK3 supplied from the clock generation circuit block 56 (which will be described later). These B.S.C. blocks 53 to 55 constitute the LFSR of the present invention. Any one of the blocks therefore includes a circuit element (not shown) for satisfying the conditions of signature compression as shown in, for example, FIG. 3. The B.S.C. blocks include an FBI (feedback signal input) terminal or an FBO (feedback signal output) terminal both for constituting a linear feedback circuit, and also include a BSI (boundary scan input) terminal and a BSO (boundary scan output) terminal both for boundary scan transfer. The BSI terminal of the B.S.C. block 53 is supplied with a boundary scan signal output from another B.S.C. block (not shown), but the signal is cut off at the time of BIST in order to select a feedback signal. The BSO terminal of the block 55 is connected to a BSI terminal of still another B.S.C. block (not shown).

Figure 8:
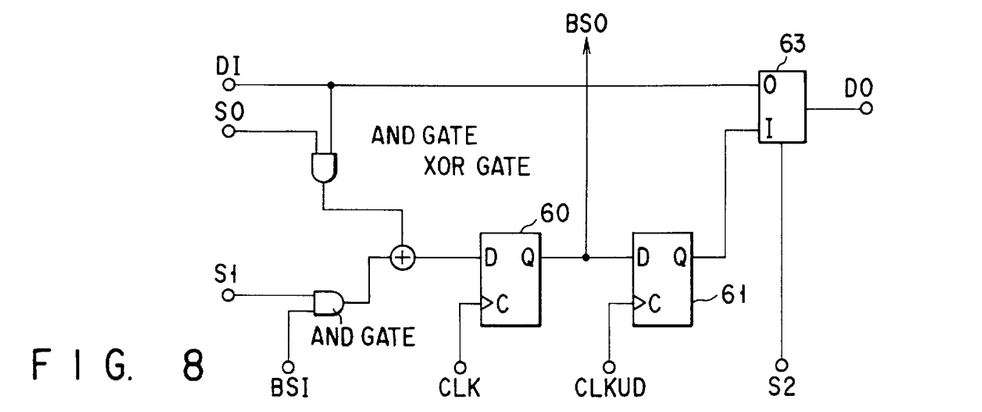
FIG. 8 is a view showing a constitution of a basic circuit of one bit for a boundary scan circuit included in the semiconductor integrated circuit device shown in FIG. 7.

FIG. 8 shows an internal constitution of each of the B.S.C. blocks 53 to 55.

An F/F 60, shown in FIG. 8, is a boundary scan F/F used in a boundary scan operation mode, and also used as an F/F constituting an LFSR in performing parallel signature compression of signals output from the DUT. The clock signal output from the clock generation circuit block 56 is supplied to the terminal C of the F/F. The output terminal of the DUT (i.e., logic circuit block 51) is connected to the terminal DI, and a signal output therefrom is supplied to an output terminal (output pad, not shown) of the LSI 50 via a multiplexer 63 and a terminal DO in the normal operation where S2=0.

When S0=0 and S1=1, a boundary scan operation is performed to serially transfer the contents of F/F of respective bits of the B.S.C. blocks 53 to 55. The output signal of the DUT is input to the LFSR and, when CLK1↑, CLK2↑ and CLK3↑, a signature-compressing operation is performed in the B.S.C. blocks 53, 54 and 55. When S0=1 and S1=1, the output signal of the DUT can be latched by CLK1↑, CLK2↑ and CLK3↑ in the B.S.C. blocks 53, 54 and 55. An F/F 61 is provided to prevent data, which causes an abnormal operation, from being accidentally supplied outside the LSI during the transfer of boundary scan data using the boundary scan F/F 60. The contents of the F/F 61 can be changed if necessary data is first transferred to the boundary scan F/F 60 in the boundary scan operation mode and then an updating clock CLK-UD is caused to rise.

Figure 9:
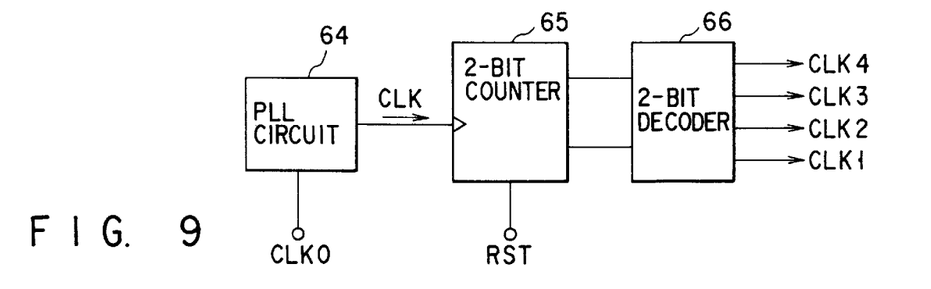
FIG. 9 is a view showing a constitution of a clock generation circuit included in the semiconductor integrated circuit device of the fourth embodiment.

The clock generation circuit 56 multiplies the frequency of a basic clock signal CLK0 input from outside the LSI 50 by a fixed number and generates a plurality of clocks CLK1, CLK2 and CLK3 each having a cycle corresponding to the multiplied frequency as the minimum pulse width. An example of the arrangement of the circuit block 56 is shown in FIG. 9. In this example, the frequency of CLK0 is multiplied by four.

Figure 10:
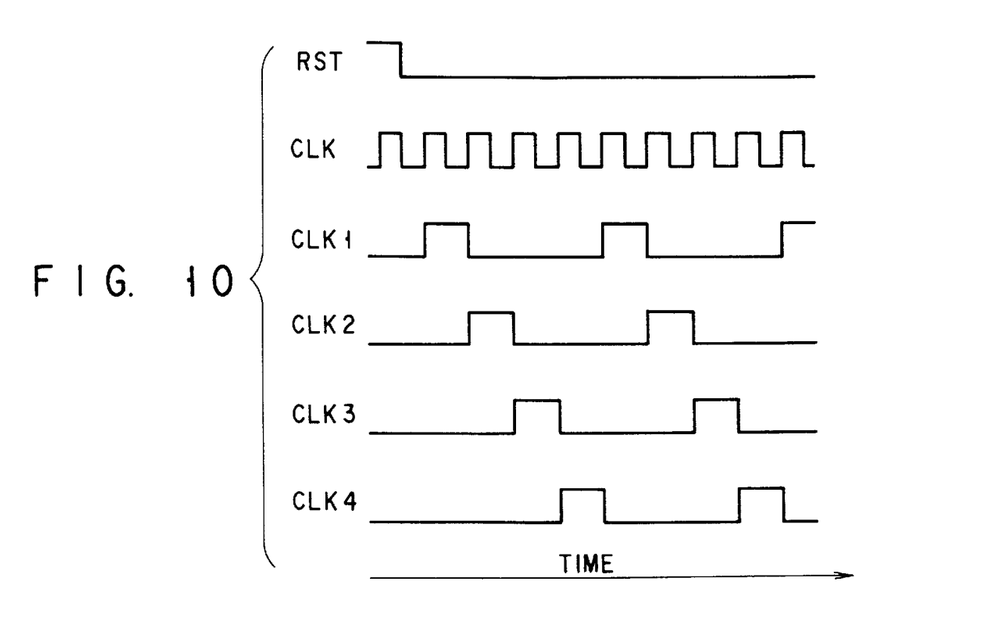
FIG. 10 is a timing chart of the clock generation circuit of the device shown in FIG. 7.

The circuit block shown in FIG. 9 includes a PLL (phase locked loop) circuit 64, a 2-bit counter 65, and a 2-bit decoder 66. The PLL circuit is a circuit for multiplying the frequency of a basic clock signal CLK0 input from outside by an integral number. The circuit block generates, from the signal CLK0, a clock signal CLK whose frequency is four times as high as that of CLK0. The counter 65 is counted up in response to the signal CLK. The decoder 66 sets only the clock signals CLK1, CLK2, CLK3 and CLK4 to 1 in response to output values 00, 01, 10 and 11 of the counter 65 (CLK4 is not used in the LSI 50). The counter 65 is initialized so as to output "11" by a reset signal RST=1. FIG. 10 shows a timing chart of the clock signals generated from the above circuit shown in FIG. 9.

Strictly speaking, the circuit block of this example is considerably improved by signature compression at the three clock edges, as compared with a conventional one, but it is somewhat difficult to correctly check a delay in AC output of the DUT. To attain a more precise time resolution, a clock signal CLK having a higher frequency than in the above embodiments has to be generated by the PLL circuit in the circuit block 56, and the pulse width between the clock edges has to be decreased.

Needless to say, a plurality of clock signals, which are supplied by the circuit block 56, can be supplied from outside the LSI through a plurality of pins. Furthermore, an LFSR capable of generating pseudorandom numbers, as shown in FIG. 4, can be used as a test data generation circuit. An output signal of the test generation circuit is then supplied to the input terminal of the DUT.

Figure 11:
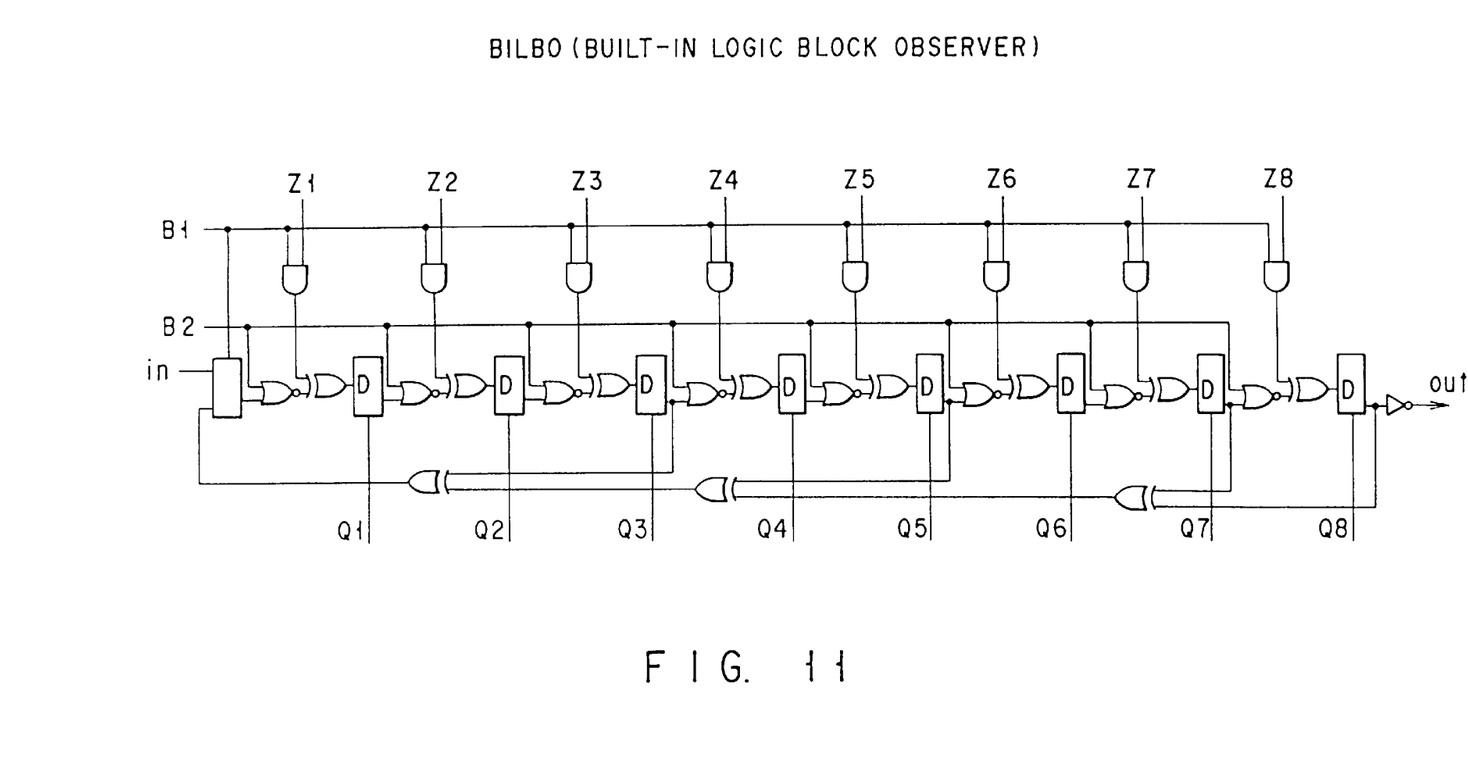
FIG. 11 is a view showing a constitution of BILBO.

The present invention can be applied to various circuits as well as those of the above-described embodiments. For example, a BILBO (built-in logic block observer) shown in FIG. 11 can be implemented with the present invention. The BIST has the great advantage that a number of test data are supplied from an automatic test data generation circuit to the DUT, the signals output from the DUT in response to the data are signature-compressed, and finally a failure can be detected by simply checking the results (signature) in the LFSR, whereas it has the disadvantage that neither a cycle of an abnormal output signal of the DUT nor its abnormal data can be detected and it is considerably difficult to diagnose a specific failure. The BILBO is intended to overcome the disadvantage of the BIST by adding a simple circuit to the LFSR to allow both the signature compression and scanning operation. As is apparent from FIG. 11, an operation of the BILBO is defined by two control signals $B_1$ and $B_2$. When $B_1=1$ and $B_2=1$, the BILBO operates in a normal operation mode (output signals $Z_1$ to $Z_8$ of the DUT are latched by different D-type F/F). When $B_1=1$ and $B_2=0$, it operates as a parallel-input LFSR to enable parallel signature compression. When $B_1=0$ and $B_2=0$, it performs a scanning operation. If the BILBO is so arranged that its internal F/F are operated in synchronization with different clocks, it is easy to understand that the present invention can be applied to the BILBO. All the circuits based on the LFSR should be included within a range of the present invention. Moreover, any changes or modifications to the levels of circuit elements such as logic gates and transistors and the polarities of signals, can be made within the range of the present invention.

Since the LFSRs of the above embodiments allows F/F to be operated in synchronization with different clocks to generate pseudorandom numbers and execute signature compression, the area efficiency of an internal portion of an LSI operated in synchronization with a plurality of clocks is increased, as is that of an I/O section of the LSI whose signals vary with different timings, thereby achieving a very functional BIST capable of detecting a delay of AC output of the DUT.

According to the present invention described above, a linear feedback shift register which includes F/F operated in synchronization with different clocks and satisfies the conditions for linear feedback or generation of pseudorandom numbers, can be provided.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A device for testing an integrated circuit, said device comprising:
   a plurality of groups of flip-flops forming a linear feedback shift register, each of said groups of flip-flops operated in synchronization with clock signals different from each other in at least one of phase and clock cycle; and
   a condition satisfying means for connecting said plurality of groups of flip-flops to each other, for satisfying linear feedback conditions for signature compression, and for satisfying conditions for generation of pseudorandom numbers.

2. The semiconductor integrated circuit device according to claim 1, wherein said condition satisfying means includes a delay circuit for delaying a signal output from one group of flip-flops to satisfy the linear feedback conditions for signature compression and for satisfying conditions for generation of pseudorandom numbers, and supplying a delayed signal to another group of flip-flops.

3. The semiconductor integrated device according to claim 2, wherein said delay circuit includes at least one of a flip-flop circuit and a latch circuit.

4. A device for testing a semiconductor integrated circuit, said device comprising:
   a feedback circuit;
   a plurality of flip-flops forming a linear feedback shift register operated in synchronization with clock signals different from each other in at least one of phase and clock cycle, wherein said plurality of flip-flops has an input that receives a feedback signal of said feedback circuit and an output that transmits a signal to the feedback circuit; and
   condition satisfying means provided between at least two of said flip-flops of said plurality of flip-flops for satisfying linear feedback conditions for signature compression.

5. The semiconductor integrated circuit device according to claim 4, wherein said plurality of flip-flops includes:
   a first flip-flop supplied with an exclusive OR signal of the feedback signal and a first data signal output from a device-under-test circuit, and operated in synchronization with a first clock signal,
   a second flip-flop supplied with an exclusive OR signal of an output signal of a preceding flip-flop and a second data signal output from the device-under-test circuit, and operated in synchronization with a second clock signal other than the first clock signal, and
   said feedback circuit includes an exclusive OR circuit supplied with at least one of an arbitrary output signal of said first flip-flop and an arbitrary output signal of said second flip-flop and generating the feedback signal.

6. The semiconductor integrated circuit device according to claim 5, further comprising a test result generation circuit.

7. The semiconductor integrated circuit device according to claim 5, wherein said at least one of the arbitrary output signal of said first flip-flop and the arbitrary output signal of said second flip-flop is input to the exclusive OR circuit of said feedback circuit through said condition satisfying means to satisfy the linear feedback conditions for signature compression.

8. The semiconductor integrated circuit device according to claim 4, wherein said condition satisfying means includes a delay circuit for delaying an input signal to satisfy the linear feedback conditions for signature compression and for outputting a delayed signal.

9. The semiconductor integrated circuit device according to claim 8, wherein said delay circuit includes at least one of a flip-flop and a latch circuit.

10. The semiconductor integrated circuit device according to claim 4, further comprising a clock signal generation circuit for receiving a basic clock signal from outside a chip and generating different clock signals in response to the basic clock signal, said clock signal generation circuit multiplying a frequency of the basic clock signal by a fixed number and generating the different clock signals each having a cycle corresponding to the multiplied frequency as a minimum pulse width.

11. The semiconductor integrated circuit device according to claim 10, wherein said clock signal generation circuit includes a PLL circuit.

12. A device for testing a semiconductor integrated circuit, said device comprising:

a feedback circuit;

a plurality of flip-flops forming a linear feedback shift register operated in synchronization with clock signals different from each other in at least one of phase and clock cycle, wherein said plurality of flip-flops has an input that receives a feedback signal of said feedback circuit and an output that transmits a signal to the feedback circuit; and condition satisfying means provided between at least two of said flip-flops of said plurality of flip-flops, for satisfying conditions for generation of pseudorandom numbers.

13. The semiconductor integrated circuit device according to claim 12, wherein said plurality of flip-flops includes at least:

a first flip-flop group supplied with the feedback signal and operated in synchronization with a first clock signal, a second flip-flop group supplied with an output signal of said first flip-flop group and operated in synchronization with a second clock signal other than the first clock signal, and said feedback circuit includes an exclusive OR circuit supplied with at least one of an arbitrary output signal of said first flip-flop group and an arbitrary output signal of said second flip-flop group and generating the feedback signal.

14. The semiconductor integrated circuit device according to claim 13, wherein said at least one of the arbitrary output signal of said first flip-flop group and the arbitrary output signal of said second flip-flip group is input to the exclusive OR circuit of said feedback circuit through said condition satisfying means to satisfy the conditions for generation of pseudorandom numbers.

15. The semiconductor integrated circuit device according to claim 12, further comprising a test data generation circuit.

16. The semiconductor integrated circuit device according to claim 12, wherein said condition satisfying means includes a delay circuit for delaying an input signal to satisfy the conditions for generation for pseudorandom numbers and for outputting a delayed signal.

17. The semiconductor integrated circuit device according to claim 16, wherein said delay circuit includes at least one of a flip-flop and a latch circuit.

18. The semiconductor integrated circuit according to claim 12, further comprising: a clock signal generation circuit for receiving a basic clock signal from outside a chip and generating different clock signals in response to the basic clock signal, said clock signal generation circuit multiplying a frequency of the basic clock signal by a fixed number and generating the different clock signals each having a cycle corresponding to the multiplied frequency as a minimum pulse width.

19. The semiconductor integrated circuit device according to claim 18, wherein said clock signal generation circuit includes a PLL circuit.

* * * * *

UNITED STATES PATENT AND TRADEMARK OFFICE
CERTIFICATE OF CORRECTION

PATENT NO. : 5,867,409
DATED : February 2, 1999
INVENTOR(S) : Nozuyama It is certified that error appears in the above-identified patent and that said Letters Patent is hereby corrected as shown below:

Claim 3, column 12, line 5, after "integrated", insert --circuit--.

Claim 3, column 12, line 7, after "flip-flop", delete "circuit".

Claim 14, column 14, line 4, "flip-flip" should read --flip-flop--.

Signed and Sealed this

Thirtieth Day of November, 1999

Attest:

Attesting Officer

Q. TODD DICKINSON

Acting Commissioner of Patents and Trademarks